Aug. 18, 1964  J. W. WEBSTER  3,144,892
METHOD OF FABRICATING COMPOSITE PANELS
Filed Sept. 18, 1961  2 Sheets-Sheet 1

INVENTOR.
JOHN W. WEBSTER
BY
*Schmieding and Fultz*
ATTORNEYS

Aug. 18, 1964   J. W. WEBSTER   3,144,892
METHOD OF FABRICATING COMPOSITE PANELS
Filed Sept. 18, 1961   2 Sheets-Sheet 2

INVENTOR.
JOHN W. WEBSTER
BY
Schmieding and Fultz
ATTORNEYS

United States Patent Office 3,144,892
Patented Aug. 18, 1964

3,144,892
METHOD OF FABRICATING COMPOSITE PANELS
John W. Webster, Upper Arlington, Ohio, assignor to
D. B. Frampton & Company, Columbus, Ohio, a corporation of Ohio
Filed Sept. 18, 1961, Ser. No. 138,877
6 Claims. (Cl. 144—318)

This invention relates to wood panels and particularly to a novel method of fabricating composite panels of the type that are constructed from a plurality of panel components secured together by threaded metal dowels.

In general, the method of the present invention comprises fabricating a plurality of wood panel components that include side surfaces provided with longitudinally extending channels.

The components are then assembled in a jig with the side surfaces in contiguous side by side relationship.

The components are next drilled to form laterally extending bores into which the threaded metal dowels are later to be driven. The bores are formed with long drills, the tips of which enter each successive component at the channel in the side wall whereby the channels serve as lead holes for starting the tips of the drills at the proper centered locations in the side walls of the components. The channels serve the additional function of releasing cuttings from the bores as the drills progress whereby accumulation of cuttings in the bore is prevented.

In accordance with the present invention a plurality of threaded metal dowels are formed of light relatively soft metal, such as aluminum alloy, said dowels being threaded to full thread diameter from one end tip to the other whereby the edge panel components are strongly attached to the assembly. Moreover, the size of the dowels is such that the pitch diameter of the threads is equal to the bore diameter of the drilled holes whereby the crest of the threads bite into the walls of the drilled holes for a depth substantially equal to one-half of the depth of the threads. It has been discovered that this arrangement in combination with the previously mentioned chip releasing channels completely eliminates splitting of the panel components when the dowels are subsequently driven into the bores.

As another aspect of the method of the present invention the dowels are formed of an appropriate length and driven to positions in the bores whereby the threaded end tips terminate just short of the outer surfaces of the edge panel components. With this arrangement the end tips of the dowels are caused to engage the edge panel components for substantially the entire lengths of the bores whereby the edge panel components are strongly attached to the assembly.

As another aspect of the method of the present invention, the confronting side surfaces of the panel components are slightly cambered inwardly whereby the clamping action of the threaded dowel as it cuts its way through the panel components draws the confronting edges of the components together whereby gaps in the faces of the panel are completely eliminated.

As still another aspect of the invention the confronting side surfaces of the panel components are provided with tongues and grooves that are joined together in light press fit engagement whereby stresses are uniformly transmitted from component to component.

It is therefore an object of the present invention to provide an improved method for fabricating composite panels that utilizes threaded dowels formed of light, relatively soft metal that can be readily sawed or machined simultaneously with the wood.

It is another object of the present invention to provide an improved method of the type described that utilizes dowels the pitch diameters of which are substantially equal to the diameters of the bores in which they are driven whereby splitting of the panel components is eliminated.

It is another object of the present invention to provide an improved method of the type described wherein the confronting side surfaces of the panel components are provided with longitudinally extending channels that form lead holes for the drill tips during the boring operation whereby proper centering of the bores and dowels is consistently achieved.

It is another object of the present invention to provide an improved method of the type described wherein the panel components are provided with confronting side surfaces that are cambered slightly inwardly to eliminate gaps in the finished panel surfaces.

It is still another object of the present invention to provide an improved method of the type described wherein the confronting side surfaces of the panel components are provided with tongues and grooves disposed in light press fit engagement whereby stresses are uniformly transmitted between the panel components.

Further objects and advantages of the present invention will be apparent from the following description, reference being had to the accompanying drawings wherein a preferred form of embodiment of the invention is clearly shown.

Referring in detail to the drawings a panel constructed in accordance with the present invention is indicated generally at 20 and includes a plurality of panel components one of which is indicated at 22.

The right and left edge panel components are designated 24 and 26. The components 22, 24, and 26 are joined together by a threaded dowel indicated generally at 28 that is formed of light relatively soft metal such as aluminum alloy, magnesium, or the like.

The panel components are provided with aligned bores 30 which are formed by drilling after the components are assembled in a jig.

Figures 1, 2, 3:
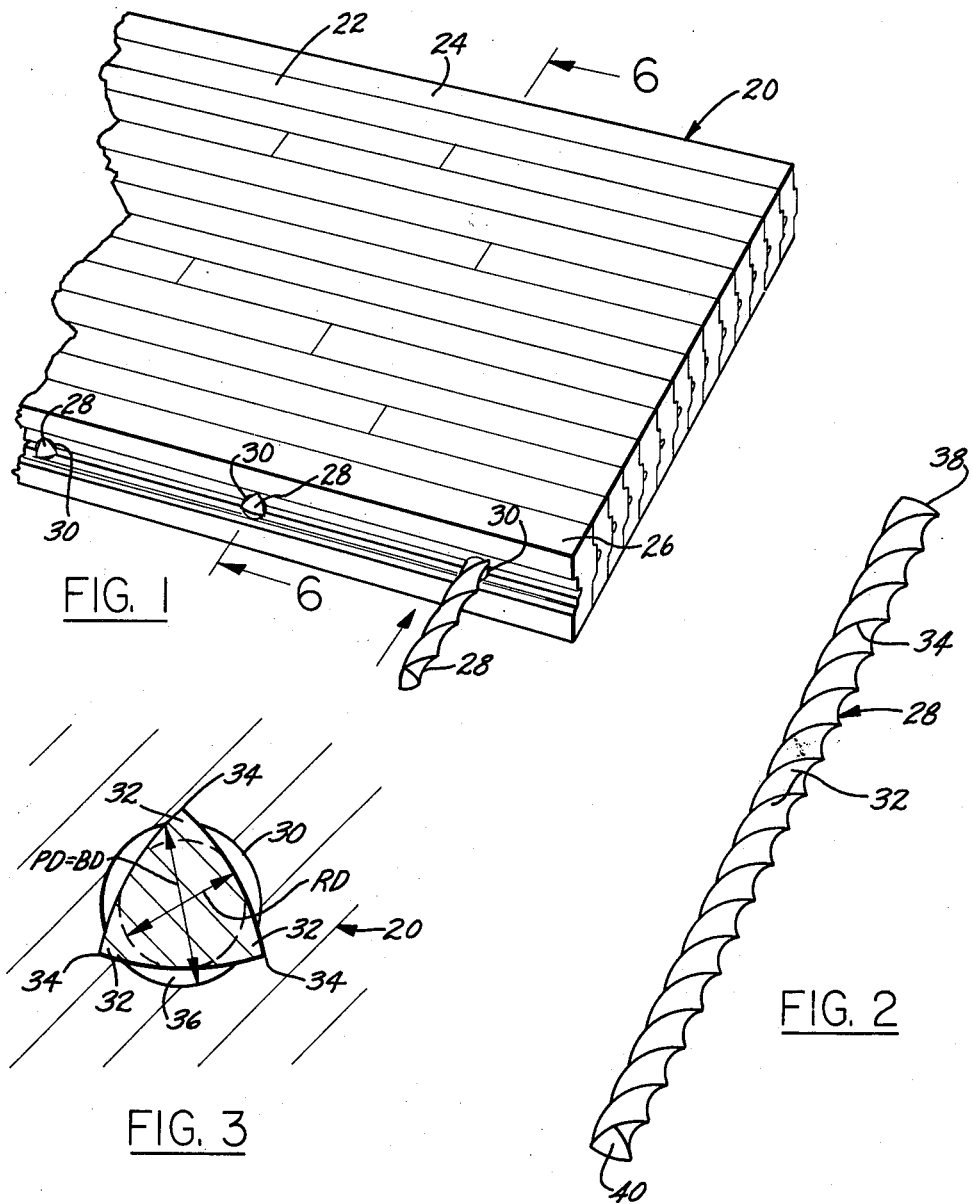
FIG. 1 is a partial perspective view of a composite panel constructed in accordance with the present invention.
FIG. 2 is a perspective view of a dowel formed in accordance with the present invention.
FIG. 3 is a partial end sectional view through the panel and dowel of the preceding figures.
Figure 4:
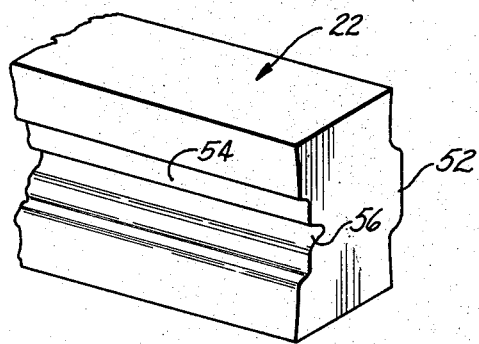
FIG. 4 is a partial perspective view of a panel component comprising a portion of the panel of FIG. 1.
Figure 5:
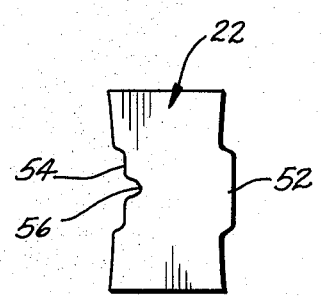
FIG. 5 is an end elevational view of the panel component of FIG. 4.

As is best seen in FIGS. 2 and 3 dowel 28 includes a plurality of convolutions or threads 32 and the pitch diameter PD of the threads is substantially equal to the bore diameter BD whereby the crests 34 of the threads bite into the walls of the bores but the root diameter RD of the threads, being less than the diameter BD of the bores provides clearance spaces 36 for chips and distortion of the walls of the bores whereby splitting of the panel components is prevented.

It should be pointed out that the threads 32 extend in full diameter to the end tips 38 and 40 on the dowels whereby the leading edge of the dowel actually cuts its way through each succeeding panel component rather than wedging and expanding; and, moreover, the end tips of the dowels can be moved into engagement with substantially the entire length of the bores in each panel component 24 and 26 whereby these components are firmly retained in place.

In the preferred embodiment the drill, when forming bores 30, is stopped just short of the right side surface 42 of edge panel component 24. By preventing break through of the drill an edge cleanup operation is eliminated.

Figure 6:
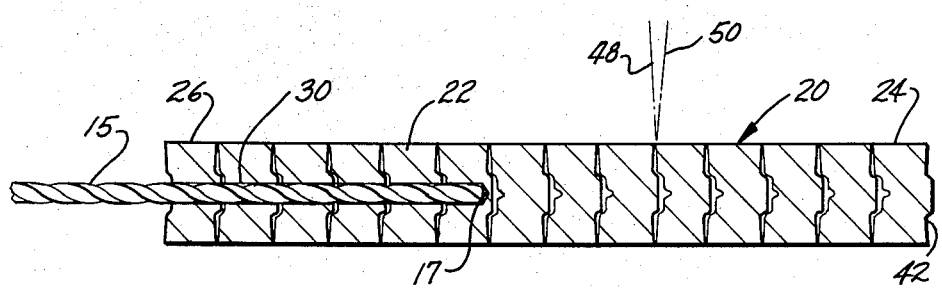
FIG. 6 is a side sectional view illustrating a drilling step comprising a step in the method of the present invention.
Figure 7:
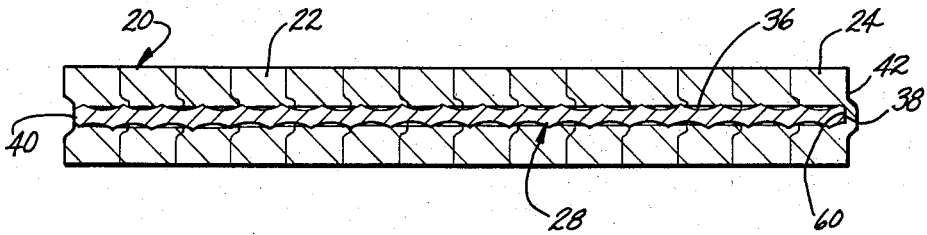
FIG. 7 is a side sectional view corresponding to FIG. 6 but showing the panel at the termination of the dowel driving operation.

As is best seen in the enlarged view of FIG. 6 the confronting side surfaces 44 and 46 of the panel components 22 are provided with a slight camber of approximately 1 degree, said camber being exaggerated in the drawings and represented by the camber angle lines 48 and 50.

The side surfaces of the panel components 22 are further provided with tongues 52 and grooves 54 disposed in light press fit engagement. A light hand press fit is found to be proper for the tongues and grooves.

Certain of the side surfaces of the panel components are provided with longitudinally extending channels 56 which form lead holes for the entry of the drill tip into each succeeding component when bores 30 are being formed. Channels 56 also perform the important function of releasing cuttings from bores 30 during the drilling operation. This makes it possible to form the blind bore 30 in each panel component 24.

In operation, the panel components 22, 24, and 26 are formed with tongues 52, grooves 54, channels 56, and cambers 48–50 in the side surfaces thereof. The components are next assembled in contiguous side by side relationship in a jig in hand press fit engagement.

Bores 30 are next formed through assembled panel components with long drills 15. During this drilling operation, the channels 56 function as lead holes for starting the drill tips 17 into each succeeding panel component whereby straightness and accurate centering of the bores is consistently achieved.

The light relatively soft metal dowels are next properly positioned and driven into the bores by an appropriate machine of the general type disclosed in the United States Letters Patent 2,567,191 issued Sept. 11, 1951. As the dowels are pressed into the bores the full diameter threads on end tips 38 of dowels 28 cut into each succeeding panel component until leading end tips 38 are driven home against the blind ends 60 of bores 30 in edge component 24.

Since the pitch diameter PD of threads 32 is substantially equal to the bore diameter BD of the bores 30 only the crest 34 of the threads bite into the walls of the bores, for substantially one-half the thread depth, to provide clearance spaces 36 to accommodate hole wall distortion and chips without splitting the components.

While the form of embodiment of the present invention as herein disclosed constitutes a preferred form, it is to be understood that other forms might be adopted, all coming within the scope of the claims which follow.

I claim:

1. The steps in the method of fabricating panels which method comprises forming a plurality of wood panel components each of which includes a first side surface that forms a tongue portion and a second side surface that forms a groove portion; forming longitudinally extending channels in certain of said side surfaces; disposing said plurality of wood panel components in side by side relationship with said tongue portions in said groove portions to form an assembly wherein said channels and confronting side surfaces form open ended passages extending to the edges of said assembly, said assembly including right and left edge components having outer edge faces; drilling aligned bores through said components and channels of substantially equal bore diameter, said passages serving to release cuttings from said aligned bores at a plurality of spaced locations along the lengths thereof; and driving into said bores a metal dowel provided with crested spiral threads extending in full diameter substantially to the end tips of said dowel, said dowel being driven to a position wherein said end tips are located just inwardly of said outer edge faces whereby said end tips grip the bores in said edge components.

2. The steps in the method of fabricating panels which method comprises forming a plurality of wood panel components each of which includes a first side surface that forms a tongue portion and a second side surface that forms a groove portion; forming longitudinally extending channels in certain of said side surfaces; disposing said plurality of wood panel components in side by side relationship with said tongue portions in said groove portions to form an assembly wherein said channels and confronting side surface form open-ended passages extending to the edges of said assembly; drilling aligned bores through said components and channels of substantially equal bore diameter, said passages serving to release cuttings from said aligned bores at a plurality of spaced locations along the lengths thereof; and driving into said bores a metal dowel provided with crested spiral threads, the pitch diameter of said threads being substantially equal to said bore diameter.

3. The steps in the method of fabricating panels which method comprises forming a plurality of wood panel components including side surfaces; forming a concave camber in certain of said side surfaces; forming longitudinally extending channels in certain of said side surfaces; disposing said plurality of wood panel components in side by side relationship to form an assembly wherein said channels and confronting sides surfaces form open ended passages extending to the edges of said assembly, said assembly including right and left edge components having outer edge faces; drilling aligned bores through said components and channels of substantially equal bore diameter, said passages serving to release cuttings from said aligned bores at a plurality of spaced locations along the lengths thereof; and driving into said bores a metal dowel provided with sharp crested spiral threads extending in full diameter to the end tips of said dowel, said dowel being driven to a position wherein said end tips are located just inwardly of said outer edge faces whereby said end tips grip the bores in said edge components.

4. The steps in the method of fabricating panels which method comprises forming a plurality of wood panel components including side surfaces; forming a concave camber in certain of said side surfaces; forming longitudinally extending channels in certain of said side surfaces; disposing said plurality of wood panel components in side by side relationship to form an assembly wherein said channels and confronting side surfaces form open-ended passages extending to the edges of said assembly; drilling aligned bores through said components and channels of substantially equal bore diameter, said passages serving to release cuttings from said aligned bores at a plurality of spaced locations along the lengths thereof; and driving into said bores a metal dowel provided with sharp crested spiral threads, the pitch diameter of said threads being substantially equal to said bore diameter.

5. The steps in the method of fabricating panels which method comprises forming a plurality of wood panel components including side surfaces; forming a longitudinally extending tongue in one side surface of each component; forming a longitudinally extending groove in the other side surface of each component; forming a longitudinally extending channels in certain of said side surfaces; disposing said plurality of wood panel components in side by side relationship to form an assembly wherein said channels and confronting side surfaces form open-ended passages extending to the edges of said assembly, said assembly including right and left edge components having outer edge faces; disposing said tongues in light press fit engagement with said grooves; forming aligned bore through said components and channels of substantially equal bore diameter, said passages serving to release cuttings from said aligned bores at a plurality of spaced locations along the lengths thereof; and driving into said bores a metal dowel provided with sharp crested spiral threads extending in full diameter to the end tips of said dowel, said dowel being driven to a position wherein said end tips are located just inwardly of said outer edge faces whereby said end tips grip the bores in said edge components.

6. The steps in the method of fabricating panels which method comprises forming a plurality of wood panel components including side surfaces; forming a longitudinally extending tongue in one side surface of each component; forming a longitudinally extending groove in the other side surface of each component; forming a longitudinally extending channel in certain of said side surfaces; disposing said plurality of wood panel components in side by side relationship to form an assembly wherein said channels and confronting side surfaces form open-ended passages extending to the edges of said assembly; disposing said tongues in light press fit engagement with said grooves; forming aligned bores through said components and channels of substantially equal bore diameter, said passages serving to release cuttings from said aligned bores at a plurality of spaced locations along the lengths thereof; and driving into said bores a metal dowel provided with sharp crested spiral threads, the pitch diameter of said threads being substantially equal to said bore diameter.

References Cited in the file of this patent

UNITED STATES PATENTS

| | | |
|---|---|---|
| 883,049 | Piver | Mar. 24, 1908 |
| 1,944,237 | Heineman | Jan. 23, 1934 |
| 2,650,395 | De Anguera | Sept. 1, 1953 |

FOREIGN PATENTS

| | | |
|---|---|---|
| 23,037 | Finland | Feb. 23, 1949 |
| 457,923 | Canada | July 5, 1949 |